United States Patent [19]

Borzatta et al.

[11] Patent Number: 5,561,179
[45] Date of Patent: Oct. 1, 1996

[54] PIPERIDINE COMPOUNDS CONTAINING SILANE GROUPS AS STABILIZERS FOR ORGANIC MATERIALS

[75] Inventors: Valerio Borzatta, Bologna; Primo Carrozza, Verona, both of Italy

[73] Assignee: Ciba-Geigy Corporation, Tarrytown, N.Y.

[21] Appl. No.: 560,263

[22] Filed: Nov. 21, 1995

[30] Foreign Application Priority Data

Nov. 30, 1994 [IT] Italy .................. MI94A2427

[51] Int. Cl.$^6$ ............ C08K 5/3492; C08K 5/3435; C07D 401/14; C07D 401/2; C07D 211/58; C07D 211/48
[52] U.S. Cl. ............... 524/99; 524/100; 524/102; 544/198; 546/14
[58] Field of Search ............... 524/99, 102, 100; 546/14; 544/198

[56] References Cited

U.S. PATENT DOCUMENTS

| | | | |
|---|---|---|---|
| 4,177,186 | 12/1979 | Rody et al. | 260/45.8 |
| 4,731,393 | 3/1988 | Karrer et al. | 522/117 |
| 4,778,838 | 10/1988 | Greco et al. | 546/14 |
| 4,859,759 | 8/1989 | Maycock et al. | 528/27 |
| 4,895,885 | 1/1990 | Foster et al. | 524/99 |
| 4,946,880 | 8/1990 | Costanzi et al. | 524/96 |
| 4,948,888 | 8/1990 | Greco et al. | 544/69 |
| 4,977,259 | 12/1990 | Greco et al. | 546/14 |
| 5,051,458 | 9/1991 | Costanzi et al. | 546/14 |
| 5,134,233 | 7/1992 | Cantatore et al. | 544/198 |
| 5,219,905 | 6/1993 | Carrozza et al. | 524/102 |
| 5,270,470 | 12/1993 | Costanzi et al. | 546/242 |
| 5,321,066 | 6/1994 | Carrozza et al. | 524/103 |
| 5,418,267 | 5/1995 | Carrozza et al. | 546/14 |
| 5,463,058 | 10/1995 | Carrozza et al. | 546/14 |

FOREIGN PATENT DOCUMENTS

| | | |
|---|---|---|
| 0162524 | 11/1985 | European Pat. Off. |
| 0182415 | 5/1986 | European Pat. Off. |
| 0244026 | 11/1987 | European Pat. Off. |
| 0343717 | 11/1989 | European Pat. Off. |
| 0388321 | 9/1990 | European Pat. Off. |
| 0480466 | 10/1991 | European Pat. Off. |
| 234682 | 4/1986 | German Dem. Rep. |
| 234683 | 4/1986 | German Dem. Rep. |

OTHER PUBLICATIONS

Derw. Abst. 86–205177/32 of DD 234,683.
Chem. Abst. 106:19478R of DD 234,683.
Derw. Abst. 86–205176/32 of DD 234,682.
Chem. Abst. 106:5979T of DD. 234,682.
Derw. Abst. 90–284499/38 of EP 388–321.
Chem Abst.

*Primary Examiner*—Veronica P. Hoke
*Attorney, Agent, or Firm*—Luther A. R. Hall

[57] ABSTRACT

Compounds of the formula (I)

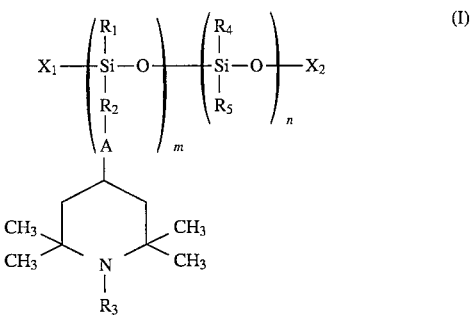

in which m and n are numbers from 1 to 50; A is —O— or >N—$R_6$ where $R_6$ is e.g. hydrogen or $C_1$–$C_{18}$ alkyl; $R_1$ and $R_4$, which may be identical or different, are $C_1$–$C_{18}$alkyl, phenyl, $C_1$–$C_8$alkoxy, OH, ONa or OK; $R_2$ is e.g. $C_2$–$C_{12}$alkylene; $R_3$ is e.g. hydrogen or $C_1$–$C_8$alkyl; $R_5$ is e.g. a group of the formula $$(R_9-A'-C)_{\overline{p}}R_{10}-$$
$$\quad\quad\; \|\atop O$$

in which $R_9$ is e.g. 2,2,6,6-tetramethyl-4-piperidyl; A' has one of the meanings of A; p is e.g. 1 and $R_{10}$ is e.g. $C_2$–$C_{18}$alkylene; $X_1$ has one of the meanings of $R_1$ or is a group $(R_{27})_3$SiO— where $R_{27}$ is $C_1$–$C_{18}$alkyl; $X_2$ is hydrogen, Na, K, $C_1$–$C_8$alkyl or a group $(R_{27})_3$Si— with $R_{27}$ as defined above and, when m+n is a number from 3 to 10, $X_1$ and $X_2$ together can also represent a direct linkage; are useful as stabilizers for organic materials against degradation induced by light, heat or oxidation.

12 Claims, No Drawings

PIPERIDINE COMPOUNDS CONTAINING SILANE GROUPS AS STABILIZERS FOR ORGANIC MATERIALS

The present invention relates to novel piperidine compounds containing silane groups, their use as light, heat and oxidation stabilizers for organic materials, especially synthetic polymers, and organic materials thus stabilized.

The use of derivatives of 2,2,6,6-tetramethylpiperidine containing silane groups, such as those noted in U.S. Pat. Nos. 4,177,186, 4,859,759, 4,895,885, 4,946,880, 4,948,888, 5,134,233, 5,219,905, 5,321,066, EP-A-162,524, EP-A-182,415, EP-A-244,026, EP-A-343,717, EP-A-388,321, EP-A-480,466, DD-A-234,682 and DD-A-234,683, as stabilizers for synthetic polymers, is known.

The present invention relates to novel compounds of the formula (I)

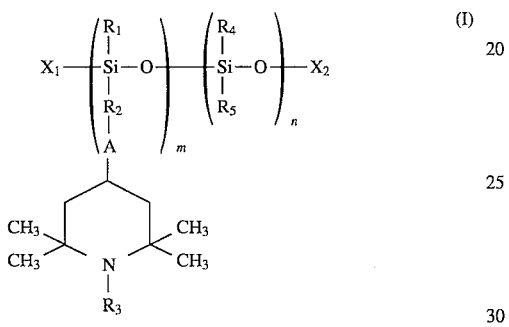

in which m and n, which may be identical or different, are numbers from 1 to 50; A is —O— or >N—$R_6$ where $R_6$ is hydrogen, $C_1$–$C_{18}$alkyl, $C_5$–$C_{12}$cycloalkyl either unsubstituted or substituted with 1, 2 or 3 $C_1$–$C_4$alkyls; $C_7$–$C_9$phenylalkyl either unsubstituted or substituted on the phenyl with 1, 2 or 3 $C_1$–$C_4$alkyls; tetrahydrofurfuryl, $C_2$–$C_4$alkyl substituted at position 2, 3 or 4 with $C_1$–$C_8$alkoxy or with di($C_1$–$C_4$alkyl)amino; or a group of the formula (II);

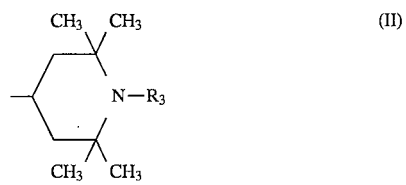

$R_1$ and $R_4$, which may be identical or different, are $C_1$–$C_{18}$alkyl, phenyl, $C_1$–$C_8$alkoxy, OH, ONa or OK;
$R_2$ is $C_2$–$C_{12}$alkylene or represents a direct linkage, when A is —O— and $R_1$ is $C_1$–$C_{18}$alkyl or phenyl;
$R_3$ is hydrogen, $C_1$–$C_8$alkyl, O., OH, NO, $CH_2CN$, $C_1$–$C_{12}$alkoxy, $C_5$–$C_{12}$cycloalkoxy, $C_7$–$C_9$phenylalkyl either unsubstituted or substituted on the phenyl with 1, 2 or 3 $C_1$–$C_4$alkyls; or $C_1$–$C_{18}$acyl;
$R_5$ is $C_7$–$C_9$bicycloalkyl or is one of the groups of the formula (IIIa)–(IIIg);

$R_7$—O—$R_8$—, (IIIa)

$R_{11}$—N—COO—$R_{13}$—, (IIIc)
　　　|
　　　$R_{12}$

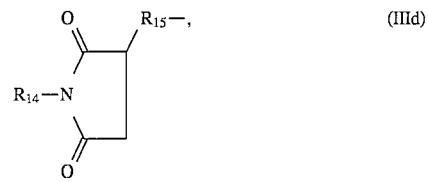

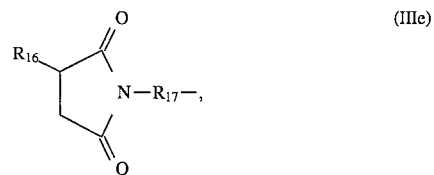

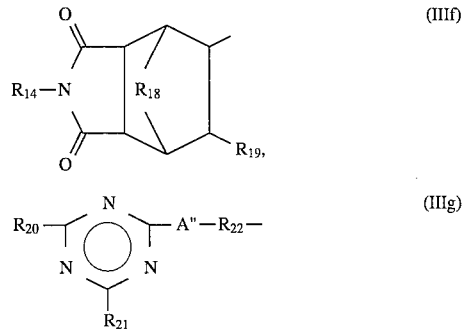

in which
$R_7$ is $C_1$–$C_{18}$alkyl, $C_5$–$C_{12}$cycloalkyl either unsubstituted or substituted with 1, 2 or 3 $C_1$–$C_4$alkyls; phenyl either unsubstituted or substituted with 1, 2 or 3 $C_1$–$C_4$alkyls or with 1, 2 or 3 $C_1$–$C_4$alkoxy; or $C_7$–$C_9$phenylalkyl either unsubstituted or substituted on the phenyl with 1, 2 or 3 $C_1$–$C_4$alkyls;

$R_8$ is $C_2$–$C_{12}$alkylene;

$R_9$ is $C_1$–$C_{18}$alkyl, $C_5$–$C_{12}$cycloalkyl either unsubstituted or substituted with 1, 2 or 3 $C_1$–$C_4$alkyls; phenyl either unsubstituted or substituted with 1, 2 or 3 $C_1$–$C_4$alkyls or with 1, 2 or 3 $C_1$–$C_4$alkoxy; $C_7$–$C_9$phenylalkyl either unsubstituted or substituted on the phenyl ring by 1, 2 or 3 $C_1$–$C_4$alkyls; tetrahydrofurfuryl or a group of the formula (II);

A' has one of the meanings of A; p is 1, 2 or 3; when p is 1, $R_{10}$ is $C_2$–$C_{18}$alkylene, when p is 2, $R_{10}$ is $C_2$–$C_{20}$alkanetriyl, $C_5$–$C_7$cycloalkanetriyl or $C_7$–$C_9$bicycloalkanetriyl, when p is 3, $R_{10}$ is $C_3$–$C_9$alkanetetrayl; $R_{11}$ and $R_{12}$, which may be identical or different, have one of the meanings of $R_9$ or

represents a heterocyclic group with 5–7 members;
$R_{13}$ is $C_2$–$C_{12}$alkylene;
$R_{14}$ is as defined above for $R_9$;
$R_{15}$ is a direct linkage or $C_1$–$C_{18}$alkylene;
$R_{16}$ is hydrogen or $C_1$–$C_{18}$alkyl;
$R_{17}$ is $C_3$–$C_{18}$alkylene;
$R_{18}$ is without meaning or is —$CH_2$— or —$CH_2CH_2$—;
$R_{19}$ is hydrogen or methyl;
$R_{20}$ and $R_{21}$, which may be identical or different, are one of the groups of the formula (IVa)–(IVe);

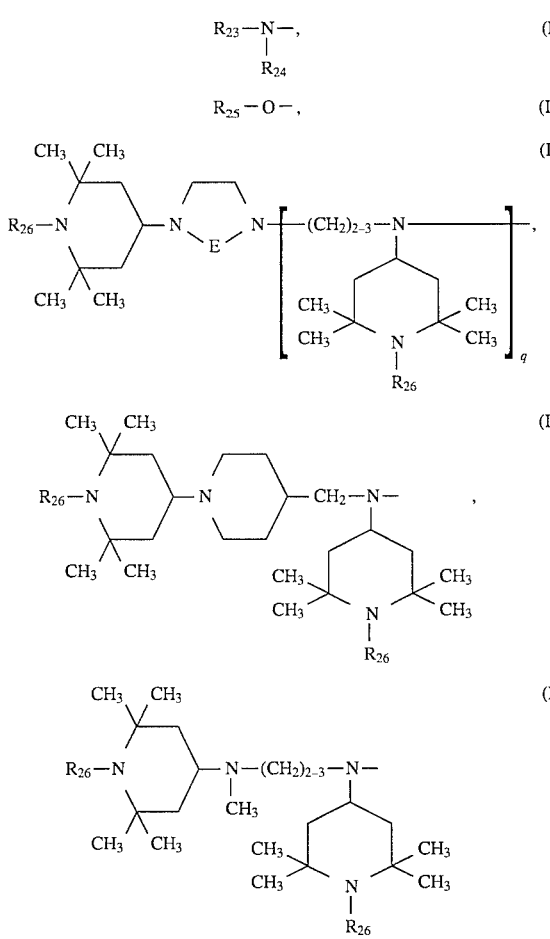

in which

R$_{23}$, R$_{24}$ and R$_{25}$, which may be identical or different, are as defined above for R$_9$ or

represents a heterocyclic group with 5–7 members;

R$_{26}$ is as defined above for R$_3$; E is >CO, —CH$_2$CH$_2$—, —CH$_2$CO— or —CO—CH$_2$—CO—, q is zero or 1 and q is zero, when E is a —CH$_2$CH$_2$—group;

A" has one of the meanings of A;

R$_{22}$ is C$_2$–C$_{12}$ alkylene;

X$_1$ has one of the meanings of R$_1$ or is a group (R$_{27}$)$_3$SiO— where R$_{27}$ is C$_1$–C$_{18}$alkyl;

X$_2$ is hydrogen, Na, K, C$_1$–C$_8$alkyl or a group (R$_{27}$)$_3$Si— with R$_{27}$ as defined above and, when m+n is a number from 3 to 10, X$_1$ and X$_2$ together can also represent a direct linkage.

Each of A, R$_1$, R$_2$, R$_3$, R$_4$ and R$_5$ can have, in the individual repeating units of the formula (I), the same meaning or different meanings and the various repeating units can have a random distribution or a block distribution.

Examples of alkyl containing not more than 18 carbon atoms are methyl, ethyl, propyl, isopropyl, butyl, 2-butyl, isobutyl, t-butyl, pentyl, 2-pentyl, hexyl, heptyl, octyl, 2-ethylhexyl, t-octyl, nonyl, decyl, undecyl, dodecyl, tridecyl, tetradecyl, hexadecyl and octadecyl.

Examples of C$_2$–C$_4$alkyl substituted with C$_1$–C$_8$alkoxy are 2-methoxyethyl, 2-ethoxyethyl, 3-methoxypropyl, 3-ethoxypropyl, 3-butoxypropyl, 3-octoxypropyl and 4-methoxybutyl. 3-Methoxypropyl and 3-ethoxypropyl are preferred.

Examples of C$_2$–C$_4$alkyl substituted with di(C$_1$–C$_4$alkyl)amino, preferably with dimethylamino or diethylamino, are 2-dimethylaminoethyl, 2-diethylaminoethyl, 3-dimethylaminopropyl, 3-diethylaminopropyl, 3-dibutylaminopropyl and 4-diethylaminobutyl.

Examples of alkoxy containing not more than 18 carbon atoms are methoxy, ethoxy, propoxy, isopropoxy, butoxy, isobutoxy, pentoxy, isopentoxy, hexoxy, heptoxy, octoxy, decyloxy, dodecyloxy, tetradecyloxy, hexadecyloxy and octadecyloxy.

Examples of C$_5$–C$_{12}$cycloalkyl either unsubstituted or substituted with 1, 2 or 3 C$_1$–C$_4$alkyls are cyclopentyl, methylcyclopentyl, dimethylcyclopentyl, cyclohexyl, methylcyclohexyl, dimethylcyclohexyl, trimethylcyclohexyl, t-butylcyclohexyl, cyclooctyl, cyclodecyl and cyclododecyl. Cyclohexyl either unsubstituted or substituted with C$_1$–C$_4$alkyl is preferred.

Examples of C$_5$–C$_{12}$cycloalkoxy are cyclopentoxy, cyclohexoxy, cycloheptoxy, cyclooctoxy, cyclodecyloxy and cyclododecyloxy.

Cyclopentoxy and cyclohexoxy are preferred.

Examples of C$_7$–C$_9$ phenylalkyl either unsubstituted or substituted on the phenyl with 1, 2 or 3 C$_1$–C$_4$alkyls are benzyl, methylbenzyl, dimethylbenzyl, trimethylbenzyl, t-butylbenzyl and 2-phenylethyl. Benzyl is preferred.

Examples of C$_1$–C$_{18}$acyl are formyl, acetyl, propionyl, butyryl, pentanoyl, hexanoyl, heptanoyl, octanoyl and benzoyl. C$_1$–C$_8$Alkanoyl and benzoyl are preferred. Acetyl is particularly preferred.

Examples of C$_1$–C$_{18}$alkylene are methylene, ethylene, propylene, trimethylene, 2-methyltrimethylene, tetramethylene, pentamethylene, hexamethylene, octamethylene, decamethylene, undecamethylene, dodecamethylene, tetradecamethylene, hexadecamethylene and octadecamethylene.

Trimethylene is preferred. A preferred meaning of R$_2$, R$_8$ and R$_{13}$ is C$_2$–C$_6$alkylene.

Examples of C$_7$–C$_9$bicycloalkyl are bicycloheptyl and decahydronaphthyl.

Examples of phenyl substituted with 1, 2 or 3 C$_1$–C$_4$alkyls or with 1, 2 or 3 C$_1$–C$_4$alkoxy are methylphenyl, dimethylphenyl, trimethylphenyl, isopropylphenyl, diisopropylphenyl, di-t-butylphenyl, methoxyphenyl, dimethoxyphenyl, ethoxyphenyl, propoxyphenyl, butoxyphenyl and di-t-butoxyphenyl.

Representative examples of C$_2$–C$_{20}$alkanetriyl are ethanetriyl, propanetriyl, butanetriyl or a group

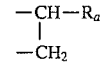

where R$_a$ is a linear or branched C$_3$–C$_{18}$alkanediyl, for example trimethylene, butylene, pentylene, hexylene, octylene, decylene, dodecylene, tetradecylene, hexadecylene or octadecylene.

Representative examples of C$_5$–C$_7$cycloalkanetriyl or C$_7$–C$_9$bicycloalkanetriyl are the groups

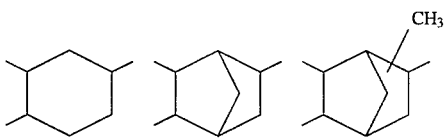

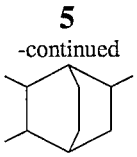

Representative examples of $C_3$–$C_6$alkanetetrayl are propanetetrayl, butanetetrayl and pentanetetrayl.

Representative examples of a 5-membered to 7-membered heterocyclic group

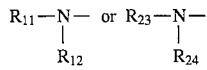

are 1-pyrrolidyl, 1-piperidyl and 4-morpholinyl.

Some preferred meanings of $R_{25}$ are for example phenyl, tolyl, ethylphenyl, isopropylphenyl, di-t-butylphenyl, methoxyphenyl, ethoxyphenyl or di-t-butoxyphenyl.

The variables n and m may be independently from one another for example a number from 2 to 40, 4 to 40, 8 to 40, 10 to 40, 4 to 35, 8 to 35 or 10 to 35.

Preferred compounds of the formula (I) are those in which

A is —O— or >N—$R_6$ where $R_6$ is hydrogen, $C_1$–$C_{12}$alkyl, $C_5$–$C_8$cycloalkyl either unsubstituted or substituted with 1, 2 or 3 $C_1$–$C_4$alkyls; benzyl either unsubstituted or substituted with 1, 2 or 3 $C_1$–$C_4$alkyls; tetrahydrofurfuryl, $C_2$–$C_3$alkyl substituted in position 2 or 3 with $C_1$–$C_4$alkoxy or with di($C_1$–$C_4$alkyl)amino; or a group of the formula (II);

$R_1$ and $R_4$, which may be identical or different, are $C_1$–$C_8$alkyl, phenyl, $C_1$–$C_6$ alkoxy or OH;

$R_2$ is $C_2$–$C_8$alkylene or is a direct linkage, when A is —O— and $R_1$ is $C_1$–$C_8$alkyl or phenyl;

$R_5$ is bicycloheptyl or one of the groups of the formula (IIIa)–(IIIg) in which $R_7$ is $C_1$–$C_{12}$alkyl, $C_5$–$C_8$cycloalkyl either unsubstituted or substituted with 1, 2 or 3 $C_1$–$C_4$alkyls; phenyl either unsubstituted or substituted with 1, 2 or 3 $C_1$–$C_4$alkyls or with 1, 2 or 3 $C_1$–$C_4$alkoxy; or benzyl either unsubstituted or substituted with 1, 2 or 3 $C_1$–$C_4$alkyls;

$R_8$ is $C_2$–$C_8$alkylene; $R_9$ is $C_1$–$C_8$alkyl, $C_5$–$C_8$cycloalkyl either unsubstituted or substituted with 1, 2 or 3 $C_1$–$C_4$alkyls; phenyl either unsubstituted or substituted with 1, 2 or 3 $C_1$–$C_4$alkyls or with 1, 2 or 3 $C_1$–$C_4$alkoxy; benzyl either unsubstituted or substituted with 1, 2 or 3 $C_1$–$C_4$alkyls; tetrahydrofurfuryl or a group of the formula (II);

A' is as defined above for A;

p is 1, 2 or 3 and, when p is 1, $R_{10}$ is $C_2$–$C_{12}$alkylene, when p is 2, $R_{10}$ is $C_2$–$C_{16}$alkanetriyl, $C_6$–$C_7$cycloalkanetriyl or $C_7$–$C_9$bicycloalkanetriyl, when p is 3, $R_{10}$ is $C_3$–$C_4$alkanetetrayl;

$R_{11}$ and $R_{12}$, which may be identical or different, are as defined above for $R_9$ or together with the nitrogen atom to which they are bound represent a 1-pyrrolidyl, 1-piperidyl or 4-morpholinyl group;

$R_{13}$ is $C_2$–$C_8$alkylene;

$R_{14}$ is as defined above for $R_9$;

$R_{15}$ is a direct linkage or $C_1$–$C_{12}$alkylene;

$R_{16}$ is hydrogen or $C_1$–$C_{12}$alkyl;

$R_{17}$ is $C_2$–$C_{12}$alkylene;

$R_{18}$ is —$CH_2$— or —$CH_2CH_2$—;

$R_{19}$ is hydrogen or methyl;

$R_{20}$ and $R_{21}$, which may be identical or different, are one of the groups of the formula (IVa)–(IVe) in which $R_{23}$, $R_{24}$ and $R_{25}$, which may be identical or different, are as defined above for $R_9$, or $R_{23}$ and $R_{24}$ together with the nitrogen atom to which they are bound represent a 1-pyrrolidyl, 1-piperidyl or 4-morpholinyl group;

E is >CO, —$CH_2CH_2$— or —$CH_2CO$—;

q is zero or 1 and, when q is zero, E is —$CH_2CH_2$—;

A" is as defined above for A;

$R_{22}$ is $C_2$–$C_8$alkylene;

$X_1$ is as defined above for $R_1$ or is a group $(R_{27})_3SIO$— with $R_{27}$ being $C_1$–$C_8$alkyl;

$X_2$ is hydrogen, $C_1$–$C_8$alkyl or a group $(R_{27})_3Si$— with $R_{27}$ as defined above;

m and n are numbers from 1 to 40 and, when m+n is a number from 3 to 10, $X_1$ and $X_2$ together also form a direct linkage.

Particularly preferred compounds of the formula (I) are those in which

A is —O— or >N—$R_6$ where $R_6$ is hydrogen, $C_1$–$C_{10}$alkyl, cyclohexyl either unsubstituted or substituted with 1, 2 or 3 $C_1$–$C_4$alkyls; benzyl, tetrahydrofurfuryl, $C_2$–$C_3$alkyl substituted in position 2 or 3 with methoxy, with ethoxy, with dimethylamino or with diethylamino; or a group of the formula (II);

$R_1$ and $R_4$, which may be identical or different, are $C_1$–$C_4$alkyl, $C_1$–$C_4$alkoxy or OH;

$R_2$ is $C_2$–$C_6$alkylene or is a direct linkage, when A is —O— and $R_1$ is $C_1$–$C_4$alkyl;

$R_5$ is one of the groups of the formula (IIIa)–(IIIg) in which $R_7$ is $C_1$–$C_8$alkyl, cyclohexyl either unsubstituted or substituted with 1, 2 or 3 $C_1$–$C_4$alkyls; phenyl, tolyl, ethylphenyl, di-t-butylphenyl, methoxyphenyl or benzyl;

$R_8$ is $C_2$–$C_6$alkylene;

$R_9$ is $C_1$–$C_4$alkyl, cyclohexyl either unsubstituted or substituted with 1, 2 or 3 $C_1$–$C_4$alkyls; phenyl, benzyl, tetrahydrofurfuryl or a group of the formula (II);

A' is as defined above for A;

p is 1, 2 or 3 and, when p is 1, $R_{10}$ is $C_2$–$C_{10}$alkylene, when p is 2, $R_{10}$ is $C_2$–$C_{14}$alkanetriyl, cyclohexanetriyl or bicycloheptanetriyl, when p is 3, $R_{10}$ is propanetetrayl;

$R_{11}$ and $R_{12}$, which may be identical or different, are as defined above for $R_9$ or together with the nitrogen atom to which they are bound represent 4-morpholinyl;

$R_{13}$ is $C_2$–$C_6$alkylene;

$R_{14}$ is as defined above for $R_9$;

$R_{15}$ is a direct linkage or $C_1$–$C_8$alkylene;

$R_{16}$ is hydrogen or $C_1$–$C_8$alkyl;

$R_{17}$ is $C_3$–$C_6$alkylene;

$R_{18}$ is methylene;

$R_{19}$ is hydrogen;

$R_{20}$ and $R_{21}$, which may be identical or different, are one of the groups of the formula (IVa)–(IVe) in which $R_{23}$, $R_{24}$ and $R_{25}$, which may be identical or different, are as defined above for $R_9$, or $R_{23}$ and $R_{24}$ together with the nitrogen atom to which they are bound represent a 4-morpholinyl group or $R_{25}$ can also be tolyl, ethylphenyl, di-t-butylphenyl or methoxyphenyl;

E is >CO or —$CH_2CH_2$—;

q is zero or 1 and, when q is zero, E is —$CH_2CH_2$—;

A" is as defined above for A;

$R_{22}$ is $C_2$–$C_6$alkylene;

$X_1$ is as defined above for $R_1$ or is a group $(R_{27})_3SiO$— with $R_{27}$ being $C_1$–$C_4$alkyl;

$X_2$ is hydrogen, $C_1$–$C_4$alkyl or a group $(R_{27})_3Si$— with $R_{27}$ as defined above;

m and n are numbers from 1 to 40 and, when m+n is a number from 3 to 10, $X_1$ and $X_2$ together also form a direct linkage.

Compounds of the formula (I) of special interest are those in which

A is —O— or >N—$R_6$ where $R_6$ is hydrogen, $C_1$–$C_8$alkyl, cyclohexyl, benzyl, tetrahydrofurfuryl or a group of the formula (II);

$R_1$ and $R_4$, which may be identical or different, are methyl, methoxy, ethoxy or OH;

$R_2$ is $C_2$–$C_3$alkylene or is a direct linkage, when A is —O— and $R_1$ is methyl;

$R_5$ is a group of the formula (IIIa), (IIIb), (IIIc), (IIId) or (IIIg) in which $R_7$ is $C_1$–$C_4$alkyl, phenyl, tolyl, di-t-butylphenyl or benzyl;

$R_8$ is $C_2$–$C_3$alkylene;

$R_9$ is $C_1$–$C_3$alkyl, cyclohexyl, benzyl or a group of the formula (II);

A' is as defined above for A;

p is 1 or 2 and, when p is 1, $R_{10}$ is $C_2$–$C_{10}$alkylene, when p is 2, $R_{10}$ is $C_2$–$C_{14}$alkanetriyl;

$R_{11}$ and $R_{12}$, which may be identical or different, are as defined above for $R_9$;

$R_{13}$ is $C_2$–$C_3$alkylene;

$R_{14}$ is as defined above for $R_9$;

$R_{15}$ is $C_2$–$C_3$alkylene;

$R_{20}$ and $R_{21}$, which may be identical or different, are a group of the formula (IVa), (IVb), (IVc) or (IVe) in which $R_{23}$, $R_{24}$ and $R_{25}$, which may be identical or different, are as defined above for $R_9$, or $R_{25}$ can also be phenyl or di-t-butylphenyl;

E is >CO or —$CH_2CH_2$—;

q is zero or 1 and, when q is zero, E is —$CH_2CH_2$—;

A" is as defined above for A;

$R_{22}$ is $C_2$–$C_3$alkylene;

$X_1$ is as defined above for $R_1$ or is a group $(R_{27})_3SiO$— in which $R_{27}$ is methyl;

$X_2$ is hydrogen, methyl, ethyl or a group $(R_{27})_3Si$— with $R_{27}$ as defined above;

m and n are numbers from 1 to 35 and, when m+n is a number from 3 to 10, $X_1$ and $X_2$ together also form a direct linkage.

Compounds of the formula (I) of particular interest are those in which

A is —O— or >N—$R_6$ where $R_6$ is hydrogen, $C_1$–$C_4$alkyl or a group of the formula (II);

$R_1$ and $R_4$, which may be identical or different, are methyl, methoxy, ethoxy or OH;

$R_2$ is trimethylene;

$R_3$ is hydrogen or methyl;

$R_5$ is a group of the formula (IIIb), (IIIc) or (IIIg);

$R_9$ is a group of the formula (II);

A' is as defined above for A;

p is 1 or 2 and, when p is 1, $R_{10}$ is $C_2$–$C_{10}$alkylene, when p is 2, $R_{10}$ is $C_2$–$C_{14}$alkanetriyl;

$R_{11}$ and $R_{12}$, which may be identical or different, are as defined above for $R_9$;

$R_{13}$ and $R_{15}$ are trimethylene;

$R_{20}$ and $R_{21}$, which may be identical or different, are a group of the formula (IVa), (IVb) or (IVc);

$R_{23}$, $R_{24}$ and $R_{25}$, which may be identical or different, are as defined above for $R_9$;

$R_{26}$ is as defined above for $R_3$;

E is >CO and q is 1;

A" is as defined above for A;

$R_{22}$ is trimethylene;

$X_1$ is as defined above for $R_1$ or is a group $(R_{27})_3SiO$— in which $R_{27}$ is methyl;

$X_2$ is hydrogen, methyl, ethyl or a group $(R_{27})_3Si$— with $R_{27}$ as defined above, m and n are numbers from 1 to 35 and, when m+n is a number from 3 to 10, $X_1$ and $X_2$ together also form a direct linkage.

Preferred meanings of $R_3$ and $R_{26}$ are hydrogen, $C_1$–$C_4$alkyl, $C_1$–$C_{12}$alkoxyl, $C_5$–$C_{12}$cycloalkoxy, benzyl either unsubstituted or substituted with 1, 2 or 3 $C_1$–$C_4$alkyls; or $C_1$–$C_4$acyl. Further preferred meanings are (1) hydrogen, $C_1$–$C_3$alkyl, $C_1$–$C_8$alkoxyl, $C_5$–$C_8$cycloalkoxy, benzyl or $C_1$–$C_3$acyl; and (2) hydrogen, methyl, methoxy, butoxy, octoxy, cyclohexyloxy, benzyl, formyl or acetyl. Hydrogen and $C_1$–$C_4$alkyl, for example methyl, are particularly preferred.

The compounds of the present invention can be prepared according to well-known procedures.

When $R_2$ is $C_2$–$C_{12}$alkylene, the compounds of the formula (I) can be prepared, for example, by hydrolyric polycondensation of compounds of the formulae (Va) and (Vb)

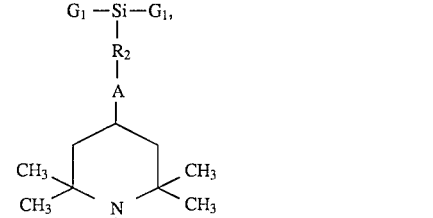

where $G_1$ is preferably Cl or $C_1$–$C_8$alkoxy and $G_2$ is preferably Cl, $C_1$–$C_8$alkoxy or phenyl as stated in U.S. Pat. Nos. 4,946 880, 5,134,233 and 5,219,905 or, when $R_1$ and $R_4$ are $C_1$–$C_{18}$alkyl or phenyl, by reaction of a compound of the formula (VI)

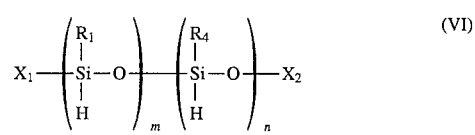

where $X_1$, $X_2$, $R_1$ and $R_4$ are as defined above with appropriate quantities of an alkene capable of forming a group

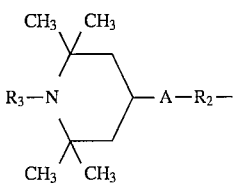

and R$_5$, where A, R$_2$, R$_3$ and R$_5$ are as defined above, performing a hydrosilylation reaction in the presence of a catalytic quantity of complex of Pt or Rh as described in EP-A-343 7 17 and EP-A-388 321 (Chem. Abstr. 115:160562f and Derwent 90-284499/38).

When R$_2$ is a direct linkage the compounds of the formula (I) can be prepared, for example, by reaction of a compound of the formula (VII)

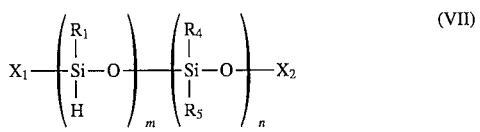

where
X$_1$, X$_2$, R$_1$, R$_4$ and R$_5$ are as defined above, with a piperidinol of the formula (VIII)

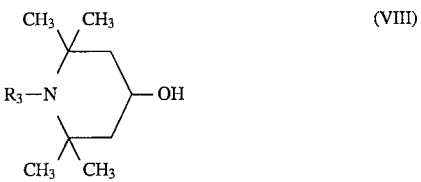

where
R$_3$ is as defined above, in the presence of catalytic quantities of a complex of Pt, Rh or Pd, as described e.g. in U.S. Pat. No. 4,895,885.

The compounds of the formula (VI) are commercially available or can be prepared according to known procedures. The alkenes capable of forming a group

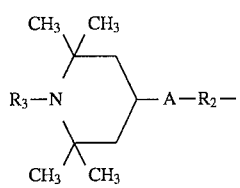

are prepared, for example, as described in U.S. Pat. Nos. 4,946,880 and 5,270,470 whereas the alkenes capable of forming a group R$_5$ are prepared, for example, as disclosed in U.S. Pat. No. 4,731,393 or according to known procedures.

The compounds of the present invention are very effective in improving the resistance to light, heat and oxidation of organic matedais, especially synthetic polymers and copolymers, and are particularly suitable for stabilizing polypropylene fibres on account of their great resistance to volatilization.

Examples of such organic materials that can be stabilized are:
1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), branched low density polyethylene (BLDPE).

Polyolefins, i.e. the polymers of monoolefins exemplified in the preceding paragraph, preferably polyethylene and polypropylene, can be prepared by different, and especially by the following, methods:
  a) radical polymerisation (normally under high pressure and at elevated temperature).
  b) catalytic polymerisation using a catalyst that normally contains one or more than one metal of groups IVb, Vb, VIb or VIII of the Periodic Table. These metals usually have one or more than one ligand, typically oxides, halides, alcoholales, esters, ethers, amines, alkyls, alkenyls and/or aryls that may be either π σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, II and/or III of the Periodic Table. The activators may be modified conveniently with further ester, ether, amine or silyl ether groups. These catalyst systems are usually termed Phillips, Standard Oil Indiana, Ziegler (–Natha), TNZ (DuPont), metallocene or single site catalysts (SSC).
2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).
3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPF/dethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.
4. Hydrocarbon resins (for example C$_5$–C$_9$) including hydrogenated modifications thereof (e.g. tackifiers) and mixtures of polyalkylenes and starch.
5. Polystyrene, poly(p-methylstyrene), poly(α-methylstyrene).

6. Copolymers of styrene or α-methylstyrene with dienes or acrylic derivatives, for example styrene/butadiene, styrene/acrylonitrile, styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

7. Graft copolymers of styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compound, pounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from aliamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimids, polyesterimids, polyhydanloins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate and polyhydroxybenzoates, as well as block copolyether esters derived from hydroxyl-terminated polyethers; and also polyesters modified with polycarbonates or MBS.

19. Polycarbonates and polyester carbonates.

20. Polysulfones, polyether sulfones and polyether ketones.

21. Crosslinked polymers derived from aldehydes on the one hand and phenols, ureas and melamines on the other hand, such as phenol/formaldehyde resins, urea/formaldehyde resins and melamine/formaldehyde resins.

22. Drying and non-drying alkyd resins.

23. Unsaturated polyester resins derived from copolyesters of saturated and unsaturated dicarboxylic acids with polyhydric alcohols and vinyl compounds as crosslinking agents, and also halogen-containing modifications thereof of low flammability.

24. Crosslinkable acrylic resins derived from substituted acrylates, for example epoxy acrylates, urethane acrylates or polyester acrylates.

25. Alkyd resins, polyester resins and acrylate resins crosslinked with melamine resins, urea resins, isocyanates, isocyanurates, polyisocyanates or epoxy resins.

26. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.

27. Natural polymers such as cellulose, robber, gelatin and chemically modified homologous derivatives thereof, for example cellulose acetates, cellulose propionates and cellulose buryrates, or the cellulose ethers such as methyl cellulose; as well as rosins and their derivatives.

28. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

29. Naturally occurring and synthetic organic materials which are pure monomeric compounds or mixtures of such compounds, for example mineral oils, animal and vegetable fats, oil and waxes, or oils, fats and waxes based on synthetic esters (e.g. phthalates, adipates, phosphates or trimellitates) and also mixtures of synthetic esters with mineral oils in any weight ratios, typically those used as spinning compositions, as well as aqueous emulsions of such materials.

30. Aqueous emulsions of natural or synthetic rubber, e.g. natural latex or latices of carboxylated styrene/butadiene copolymers.

The compounds of the formula (I) are particularly suitable for improving the light stability, heat stability and oxidation stability of polyolefins, especially polyethylene and polypropylene.

The compounds of the formula (I) can be used in mixtures with organic materials in various proportions depending on the nature of the material to be stabilized, on the end use and on the presence of other additives.

In general, it is appropriate to use, for example, 0.01 to 5 % by weight of a compound of the formula (I), relative to the weight of the material to be stabilized, preferably 0.05 to 1%.

In general, the compounds of the formula (I) can be added to the polymeric materials before, during or after the polymerization or crosslinking of the said materials.

The compounds of the formula (I) can be incorporated in the polymeric materials in the pure form or encapsulated in waxes, oils or polymers.

The compounds of the formula (I) can be incorporated in the polymeric materials by various processes, such as dry mixing in the form of powder, or wet mixing in the form of solutions or suspensions or also in the form of a masterbatch; in such operations, the polymer can be used in the form of powder, granules, solution, suspension or in the form of latices.

The materials stabilized with the products of the formula (I) can be used for the production of mouldings, films, tapes, monofilaments, fibres, surface coatings and the like.

If desired, other conventional additives for synthetic polymers, such as antioxidants, UV absorbers, nickel stabilizers, pigments, fillers, plasticizers, corrosion inhibitors and metal deactivators, can be added to the mixtures of the compounds of the formula (I) with the organic materials.

Particular examples of additives which can be used in admixture with the compounds of the formula (I) are:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)- 4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methyl-undec- 1'-yl)phenol, 2,4-dimethyl-6-(1-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-do-decylthiomcthyl-4-nonylphenol.

1.3. Hydroquinones and alkylated hydroquinones, for example 2,6-di-tert-butyl-4methoxyphenol, 2,5-di-tert-butylhydroquinone, 2,5-di-tert-amylhydroquinone, 2,6-di-phenyl- 4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl) adipate.

1.4. Tocopherols, for example α-tocopherol, β-tocopherol, γ-tocopherol, δ-tocopherol and mixtures thereof (Vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis-( 2,6-dim-ethyl-4-hydroxyphenyl) disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl- 6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α, α-dimethylbenzyl)4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl- 5-methyl-2-hydroxybenzyl)-4-methylphenol, 1,1,3-tris(5-tert-butyl-4-hydroxy2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl- 4-hydroxy-5-meth yl-phenyl)dicyclopentadiene, bis[2-(3'-tert-butyl-2'-hydroxy5'-methylbenzyl)-6-tert-butyl-4-methylphenyl] terephthalate, 1,1-bis-(3,5-dimethyl-2hydroxyphenyl)butane 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl- 4-hydroxy2-methylphenyl) pentane.

1.7. O—, N— and S-benzyl compounds, for example 3,5,3', 5'-tetra-tert-butyl-4,4'-dihydroxydibenzyl ether, octadecyl-4-hydroxy-3,5-dimethylbenzylmercaptoacetate, tridecyl-4hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5di-tert-butyl-4-hydroxybenzylmercaptoacetate.

1.8. Hydroxybenzylated malonates, for example dioctadecyl-2,2-bis-(3,5-di-tert-butyl-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis [4-(1,1,3,3-tetramethylbutyl)phenyl 1-2,2-bis(3,5-di-tert-butyl-4-hydroxybenzyl)malonate.

1.9. Aromatic hydroxybenzyl compounds, for example 1,3,5-tris-(3,5-di-tert-butyl- 4-hydroxybenzyl)-2,4,6-trimethylbenzene, 1,4-bis(3,5-di-tert-butyl-4-hydroxybenzyl)-2,3,5,6tetramethylbenzene, 2,4,6-tris(3,5-di-tert-butyl-4-hydroxybenzyl)phenol.

1.10. Triazine Compounds,
for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxy-anilino)-1,3,5-triazine, 2-octylmercapto-4,6-bis(3,5-di-tert-butyl-4-hydroxyphenoxy)1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy- 2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates,
for example dimethyl-2,5-di-tert-butyl-4-hydroxybenzylphosphonate, diethyl-3,5-di-tert-butyl- 4-hydroxybenzylphosphonate, dioctadecyl3,5-di-tert-butyl-4-hydroxybenzylphosphonate, dioctadecyl5-tert-butyl-4-hydroxy3-methylbenzylphosphonate, the calcium salt of the monoethyl ester of 3,5-di-tert-butyl-4-hydroxybenzylphosphonic acid.

1.12. Acylaminophenols,
for example 4-hydroxylauranilide, 4-hydroxystearanilide, octyl N-(3,5-di-tert-butyl-4-hydroxyphenyl)carbamate.

1.13. Esters of β-(3-(3,5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, penmerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1 -phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.21octane.

1.17. Amides of β-(3,5-di-tert-butyl-4-hydroxyphenyl) propionic acid e.g. N,N'-bis(3,5-di-ter-butyl-4-hydroxyphenylpropionyl)hexamethylenediamine, N,N'-bis(3,5-di-tert-butyl-4-hydroxyphenylpropionyl)trimethylenediamine, N,N'-bis(3,5-di-tert-butyl- 4-hydroxyphenylpropionyl)hydrazine.

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'bis(1-ethyl-3-methylpentyl)-p-phenylenediamine, N,N'-bis( 1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n- butylaminophenol, 4-butyrylaminophenol, 4-nonanoylamino-phenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, Bis[4-(1', 3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-di-hydro- 3,3-dimethyl-4H-1,4-benzothiazine, phenothiazine, a mixture of mono- und dialkylated tert-butyl/tert-octylphenothiazines, a mixture of mono- and dialkylated tert-octylphenothiazines, N-allylphenothiazin, N,N,N',N'-tetraphenyl-1,4-diaminobut-2-ene, N,N-bis(2,2,6,6-tetramethyl-piperid-4-yl-hexamethylenediamine, bis(2,2,6,6-tetramethylpiperid- 4-yl)sebacate, 2,2,6,6-tetramethylpiperidin-4-one, 2,2,6,6-tetramethylpiperidin-4-ol.

2. UV absorbers and light stabilisers 2.1. 2-(2'-Hydroxyphenyl)benzotriazoles,
for example 2-(2'-hydroxy-5'-methylphenyl)benzotriazole, 2-(3',5'-di-tert-butyl-2'-hydroxyphenyl)benzotriazole, 2-(5'-tert-butyl-2'hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3', 5'-di-tert-amyl-2'-hydroxyphenyl)benzotriazole, 2-(3',5'-bis-(α,α-dimethylbenzyl)- 2'-hydroxyphenyl)benzotriazole, mixture of 2-(3'-tert-butyl-2'-hydroxy-5'-( 2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, and 2-(3'-tert-butyl-2'-- hydroxy-5'-(2-isooctyloxycarbonylethyl)phenylbenzotriazole, 2,2'- methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO(CH$_2$)$_3$—]$_2$, where R=3'-tert-butyl-4'-hydroxy-5'-2H-benzotriazol-2-ylphenyl.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives. 2.3. Esters of substituted and unsubstituted benzoic acids, as for example 4-tertbutylphenyl salicylate, phenyl salicylate, octylphenyl salicylate, dibenzoyl resorcinol, bis(4-tert-butylbenzoyl) resorcinol, benzoyl resorcinol, 2,4-di-tertbutylphenyl 3,5-di-tert-butyl-4-hydroxybenzoate, hexadecyl 3,5-di-tert-butyl-4-hydroxybenzoate, octadecyl 3,5-di-tert-butyl- 4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxy-cinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, the condensate of N,N'-bis(2,2,6,6-tetramethyl-4-piperidyl)hexamethylenediamine and 4-tert-octyl-amino- 2,6-dichloro-1,3,5-triazine, tris(2,2,6,6-tetramethyl-4-piperidyl)nitdlotriacetate, tetrakis(2,2,6,6-tetramethyl-4-piperidyl)-1,2,3,4-butane-tetracarboxylate, 1,1'-(1,2-ethanediyl)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4,5]decan--dion, bis(1 -octyloxy-2,2,6,6-tetramethylpiperidyl)sebacate, bis( 1-octyloxy-2,2,6,6-tetramethylpiperidyl)succinate, the condensate of N,N'-bis-(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino- 1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidin-2,5-dione, 3-dodecyl- 1(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensation product of N,N'-bis(2,2,6,6-tetramethyl-4-piperidyl)hexamethylenediamine and 4-cyclohexylamino-2,6-di-chloro- 1,3,5-triazine, a condensation product of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimid, N(1,2,2,6,6-pentamethyl-4-piperidyl)-n-dodecylsuccinimid, 2-undecyl-7,7,9,9-tetramethyl1-oxa-3,8-diaza-4-oxo-spiro[4,5]decane, a reaction product of 7,7,9,9-tetramethyl- 2-cyclo-undecyl-1-oxa-3,8-diaza-4-oxospiro [4,5]decane und epichlorohydrin.

2.7. Oxamides for example 4,4'-dioctyloxyoxanilide, 2,2'-diethoxyoxanilide, 2,2'-dioc-tyloxy- 5,5'-di-tert-butoxanilide, 2,2'-didodecyloxy-5,5'-di-tert-butoxanilide, 2-ethoxy- 2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide and mixtures of ortho- and para-methoxy-disubstituted oxanilides and mixtures of o- and p-ethoxy-disubstituted oxanilides.

2.8.2-(2-Hydroxyphenyl)-1,3,5-triazines, for example 2,4,6-tris(2-hydroxy-4-octyloxyphenyl)- 1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4bis(2-hydroxy-4-propyloxyphenyl)-6-(2,4-dimethylphenyl)-1,3,5-triazine, 2-(2-hydroxy4-octyloxyphenyl)-4,6-bis(4-methylphenyl)-1,3,5-triazine, 2-(2-hydroxy-4-dodecyloxyphenyl)- 4,6-bis(2,4-dimethylphenyl)-1,3,5-triazine, 2-(2-hydroxy-4-tridecyloxyphenyl)4,6-bis(2,4-dimethylphenyl)-1,3,5-triazine, 2-[2-hydroxy-4-(2-hydroxy-3-butyloxy-propoxy- 4,6-bis(2,4-dimethyl)-1,3,5-triazine, 2- [2-hydroxy-4-(2-hydroxy- 3-octyloxypropyloxy)phenyl]-4,6-bis(2,4-dimethyl)-1,3,5-triazine, 2-[4-(dodecyloxy/tridecyl-oxy- 2-hydroxypropoxy)-2-hydroxy-phenyl-4,6-bis(2,4-dimethylphenyl)-1,3,5-triazine, 2-[2-hydroxy-4-(2-hydroxy-3-dodecyloxy-propoxy) phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy- 4-methoxyphenyl)-4,6-diphenyl-1,3,5-triazine, 2,4,6-tris[2-hydroxy-4-(3-butoxy- 2-hydroxy-propoxy)phenyl]-1,3,5-triazine, 2-(2-hydroxyphenyl)-4-(4-methoxyphenyl)- 6-phenyl-1,3,5-triazine.

3.Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl) hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacctyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenyl alkyl phosphires, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2, 6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-ten-butyl-12H-dibenz[d,g]-1,3,2-dioxaphosphocin, 6-fluoro-2,4,8,10-tetra-tert-butyl-12-methyl-dibenz[d,g]-1,3,2-dioxaphosphocin, bis(2,4-di-tert-butyl- 6methylphenyl)methylphosphite, bis(2,4-di-tert-butyl-6-methylphenyl)ethylphosphite.

5. Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenareal tallow amine.

6. Nitrones, for example, N-benzyl-alpha-phenyl-nitrone, N-ethyl-alpha-methyl-nitrone, N-octyl-alpha-heptyl-nitrone, N-lauryl-alpha-undecyl-nitrone, N-tetradecyl-alpha-tridecyl-nitrone, N-hexadecyl-alpha-pentadecyl-nitrone, N-ocutdecyl-alpha-heptadecyl-nitrone, N-hexadecyl-alpha-heptadecyl-nitrone, N-ocatadecyl-alpha-pentadecyl-nitrone, N-heptadecyl-alpha-heptadecyl-nitrone, N-octadecyl-alpha-hexadecyl-nitrone, nittone derived from N,N-dialkylhydroxylamine derived from hydrogenated tallow amine.

7. Thiosynergists, for example, dilauryl thiodipropionate or distearyl thiodipropionate. 8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Polyamide stabisers, for example, copper salts in combination with iodides and/or phosphorus compounds and salts of divalent manganese.

10. Basic co-stabilisers.

for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, zinc stearate, magnesium behenate, magnesium stearate, sodium ricinoleate and potassium palmitate, antimony pyrocatecholate or tin pyrocatecholate.

11. Nucleatingagent, for example, inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers ("ionomers").

12. Fillers and reinforcing agents, for example, calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

13. Other additives, for example, plasticisers, lubricants, emulsifiers, pigments, rheology additives, catalysts, flow-control agents, optical brighteners, flameproofing agents, antistatic agents and blowing agents.

14. Benzuranones and iodolinones, for example those disclosed in U.S. Pat. Nos. 4,325,863, 4,338,244, 5,175,312, 5,216,052, 5,252,643, DE-A-4, 316,611, DE-A-4,316,622, DE-A-4,316,876, EP-A-0, 589,839 or EP-A-0,591,102 or 3-[4-( 2-acetoxyethoxy)phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7 -di-tert-butyl-3-(4-[2-hydroxyethoxy] phenyl)benzofuran- 2-one]. 5,7-di-tert-butyl-3-(4-ethoxyphenyl)benzofuran-2-one, 3-(4-acetoxy- 3,5-dimethylphenyl)-5,7-di-tert-butyl-benzofuran-2-one, 3-(3,5-dimethyl- 4-pivaloyloxyphenyl)-5,7 -di-tert-butyl-benzofuran-2-one.

The compounds of the invention can also be used as stabilizers, especially as light stabilizers, for almost all materials known in the art of photographic reproduction and other reproduction techniques as e.g. described in Research Disclosure 1990, 31429 (pages 474 to 480).

Several examples of the preparation and use of the compounds of the formula (I) are reported for more detailed illustration of the present invention. The compounds of the following Examples 1 and 2 reveal a preferred embodiment of the present invention.

EXAMPLE 1

Preparation of a polysiloxane of the formula

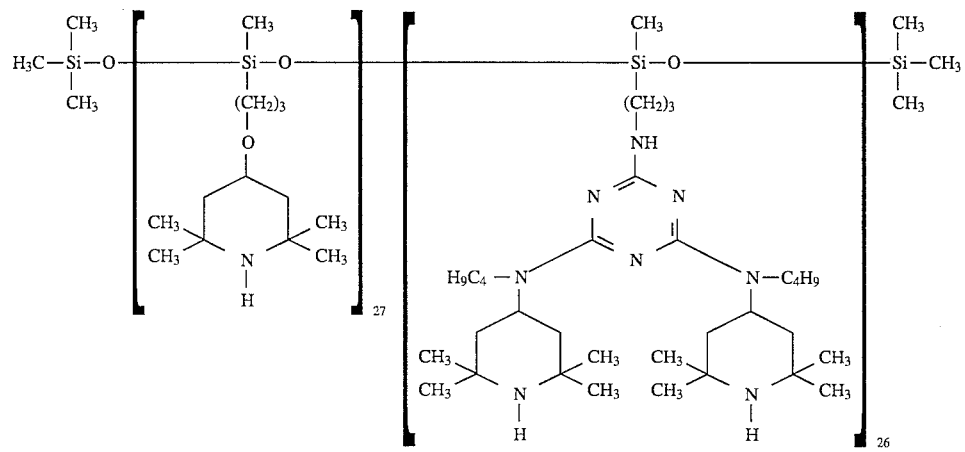

43.1 g (77.8 mmol) of 2-allylamino-4,6-bis[N-(2,2,6,6-tetramethyl-4-Piperidyl)butyl amino]-1,3,5-triazine are dissolved in 50 ml of xylene, and 2 mg of PtC$_{12}$(styrene)2 are added.

The solution is heated to 140° C. and, while stirring, a solution of 10 g (3 retool) of trimethylsilyl terminated polymethylhydrosiloxane (possessing 53 SiH units) in 150 ml of xylene is added. The reaction is maintained at 140° C. for 3 hours. The temperature is lowered to 70° C and, as stirring continues, 17.2 g (87 mmol) of 4-allyloxy-2,2,6,6-tetramethylpiperidine dissolved in 20 ml of xylene and a further 2 mg of PtCl$_2$(styrene)$_2$ are added.

A temperature of 140° C. is maintained for 8 hours with stirring and the excess solvent and reactant are removed by vacuum distillation (140° C./0.2 mbar). A solid product is obtained with m.p. 50–55° C., NMR and IR analysis of which confirms the expected structure.

EXAMPLE 2

Preparation of a polysiloxane of the formula

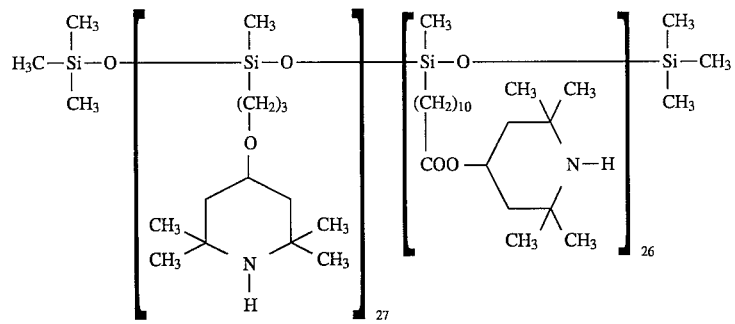

In a similar manner to that described in Example 1, 25.2 g (78 mmol) of 2,2,6,6-tetramethyl-4-piperidyl ester of 10-undecenoic acid are reacted with 10 g (3 mmol) of trimethylsilyl terminated polymethylhydrosiloxane (possessing 53 Sill units) and with 17.2 g (87 mmol) of 4-allyloxy-2,2,6,6-tetramethylpiperidine in the presence of 4 mg of PtCl$_2$(styrene)$_2$ in xylene.

After evaporation of the solvent and of the excess reactant by vacuum distillation (140° C./0.2 mbar) a clear resinous product is obtained. NMR and IR analysis confirms the expected structure.

EXAMPLE 3

Light stabilization action on polypropylene fibres. 2.5 g of the product indicated in Table 1, 1 g of tris(2,4-di-t-butylphenyl) phosphite, 0.5 g of calcium monoethyl 3,5-di-t-butyl-4-hydroxybenzylphosphonate, 1 g of calcium stearate and 2.5 g of titanium dioxide are mixed in a slow mixer with 1000 g of polypropylene powder with a melt index =12 g/10 rain (measured at 230° C and 2.16 kg). The mixtures are extruded at 200°–230° C. to obtain polymer granules which are then transformed into fibres using equipment of semi-industrial type (®Leonard-Sumirago (VA) Italy) and working under the following conditions:

extruder temperature: 230°–245° C.
head temperature: 255°–260° C.
draw ratio: 1:3.5
linear density: 11 dtex per filament The fibres thus produced are exposed, after mounting on white cardboard, in a 65 WR model Weather-O-Meter (ASTM D2565-85) with a black-panel temperature of 63° C. Using samples taken after different times of exposure to light, the residual tenacity is measured by means of a constant-rate dynamometer and the exposure time in hours required for halving the initial tenacity (T$_{50}$) is then calculated.

For comparison, fibres produced under the same conditions stated above, but without addition of the stabilizers of the present invention, are also exposed. The results obtained are given in Table 1.

TABLE 1

| Stabilizing agent | T$_{50}$ (hours) |
| --- | --- |
| without stabilizing agent | 220 |
| compound of Example 1 | 2600 |
| compound of Example 2 | 2490 |

What is claimed is:
1. A compound of the formula (I)

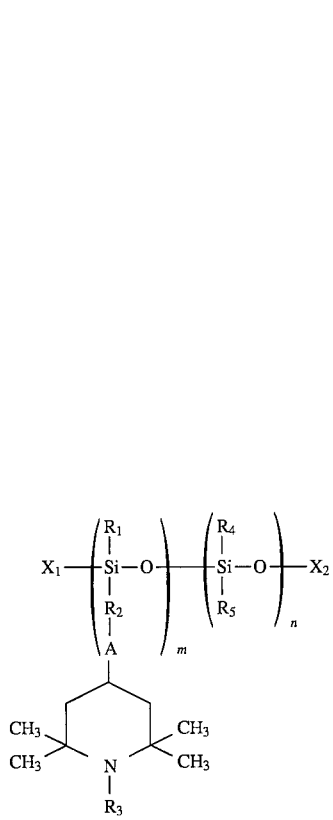

in which m and n, which may be identical or different, are numbers from 1 to 50;

A is —O— or >N—R$_6$ where R$_6$ is hydrogen, C$_1$–C$_{18}$alkyl, C$_5$–C$_{12}$cycloalkyl either unsubstituted or substituted with 1, 2 or 3 C$_1$–C$_4$alkyls; C$_7$–C$_9$phenylalkyl either unsubstituted or substituted on the phenyl with 1, 2 or 3 C$_1$–C$_4$alkyls; tetrahydrofurfuryl, C$_2$–C$_4$alkyl substituted at position 2, 3 or 4 with C$_1$–C$_8$alkoxy or with di(C$_1$–C$_4$alkyl)amino; or a group of the formula (II);

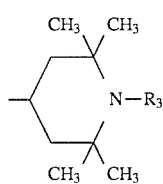

(II)

R₁ and R₄, which may be identical or different, are C₁–C₁₈alkyl, phenyl, C₁–C₈alkoxy, OH, ONa or OK;

R₂ is C₂–C₁₂alkylene or represents a direct linkage, when A is —O— and R₁ is C₁–C₁₈ alkyl or phenyl;

R₃ is hydrogen, C₁–C₈alkyl, O—, OH, NO, CH₂CN, C₁–C₁₈alkoxy, C₅–C₁₂cycloalkoxyl, C₇–C₉phenylalkyl either unsubstituted or substituted on the phenyl with 1, 2 or 3 C₁–C₄alkyls; or C₁–C₈acyl;

R₅ is C₇–C₉bicycloalkyl or is one of the groups of the formula (IIIa)–(IIIg):

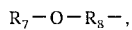 (IIIa)

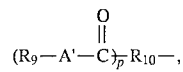 (IIIb)

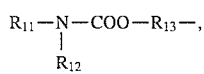 (IIIc)

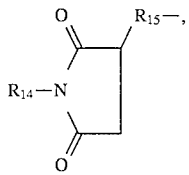 (IIId)

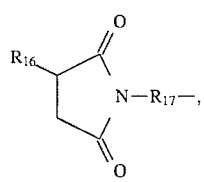 (IIIe)

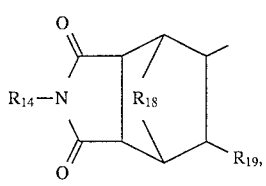 (IIIf)

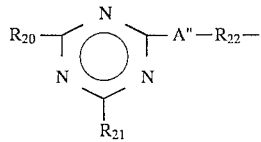 (IIIg)

in which

R₇ is C₁–C₁₈alkyl, C₅–C₁₂cycloalkyl either unsubstituted or substituted with 1, 2 or 3 C₁–C₄alkyls; phenyl either unsubstituted or substituted with 1, 2 or 3 C₁–C₄alkyls or with 1, 2 or 3 C₁–C₄alkoxy; or C₇–C₉phenylalkyl either unsubstituted or substituted on the phenyl with 1, 2 or 3 C₁–C₄alkyls;

R₈ is C₂–C₁₂alkylene;

R₉ is C₁–C₁₈alkyl, C₅–C₁₂cycloalkyl either unsubstituted or substituted with 1, 2 or 3 C₁–C₄alkyls; phenyl either unsubstituted or substituted with 1, 2 or 3 C₁–C₄alkyls or with 1, 2 or 3 C₁–C₄alkoxy; C₇–C₉phenylalkyl either unsubstituted or substituted on the phenyl ring by 1, 2 or 3 C₁–C₄alkyls; tetrahydrofurfuryl or a group of the formula (II);

A' has one of the meanings of A;

p is 1, 2 or 3; when p is 1, R₁₀ is C₂–C₁₈alkylene, when p is 2, R₁₀ is C₂–C₂₀alkanetriyl; C₅–C₇cycloalkanetriyl or C₇–C₉bicycloalkanetriyl, when p is 3, R₁₀ is C₃–C₆alkanetetrayl;

R₁₁ and R₁₂, which may be identical or different, have one of the meanings of R₉ or

represents a heterocyclic group with 5–7 members:

R₁₃ is C₂–C₁₂alkylene;

R₁₄ is as defined above for R₉;

R₁₅ is a direct linkage or C₁–C₁₈alkylene;

R₁₆ is hydrogen or C₁–C₁₈alkyl;

R₁₇ is C₃–C₁₈alkylene;

R₁₈ is without meaning or is —CH₂— or —CH₂CH₂—;

R₁₉ is hydrogen or methyl;

R₂₀ and R₂₁, which may be identical or different, are one of the groups of the formula (IVa)–(IVe);

 (IVa)

 (IVb)

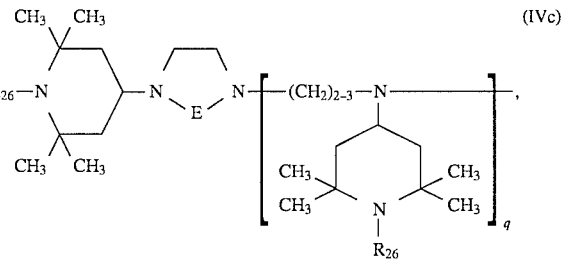 (IVc)

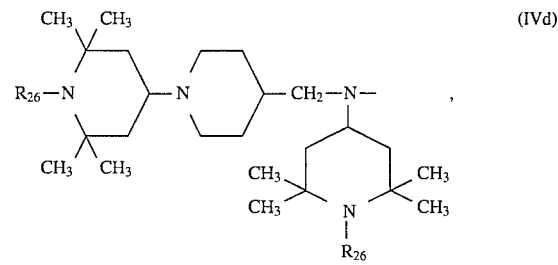 (IVd)

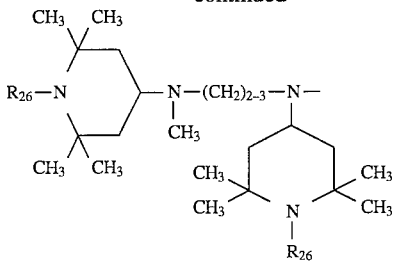

(IVe)

in which
R$_{23}$, R$_{24}$ and R$_{25}$, which may be identical or different, are as defined above for R$_9$ or

represents a heterocyclic group with 5-7 members;
R$_{26}$ is as defined above for R$_3$;
E is >CO, —CH$_2$CH$_2$—, —CH$_2$CO— or —CO—CH$_2$—CO—, q is zero or 1 and q is zero, when E is a —CH$_2$CH$_2$— group;
A" has one of the meanings of A;
R$_{22}$ is C$_2$-C$_{12}$ alkylene;
X$_1$ has one of the meanings of R$_1$ or is a group (R$_{27}$)$_3$SiO— where R$_{27}$ is C$_1$-C$_{18}$alkyl;
X$_2$ is hydrogen, Na, K, C$_1$-C$_8$alkyl or a group (R$_{27}$)$_3$Si— with R$_{27}$ as defined above and, when m+n is a number from 3 to 10, X$_1$ and X$_2$ together can also represent a direct linkage.

2. A compound of the formula (I) according to claim 1, in which A is —O— or >N—R$_6$ where R$_6$ is hydrogen, C$_1$-C$_{12}$alkyl, C$_5$-C$_8$cycloalkyl either unsubstituted or substituted with 1, 2 or 3 C$_1$-C$_4$alkyls; benzyl either unsubstituted or substituted with 1, 2 or 3 C$_1$-C$_4$alkyls; tetrahydrofurfuryl, C$_2$-C$_3$alkyl substituted in position 2 or 3 with C$_1$-C$_4$alkoxy or with di(C$_1$-C$_4$alkyl)amino; or a group of the formula (II);
R$_1$ and R$_4$, which may be identical or different, are C$_1$-C$_8$alkyl, phenyl, C$_1$-C$_6$alkoxy or OH;
R$_2$ is C$_2$-C$_8$alkylene or is a direct linkage, when A is —O— and R$_1$ is C$_1$-C$_8$alkyl or phenyl;
R$_5$ is bicycloheptyl or one of the groups of the formula (IIIa)-(IIIg) in which
R$_7$ is C$_1$-C$_{12}$alkyl, C$_5$-C$_8$cycloalkyl either unsubstituted or substituted with 1, 2 or 3 C$_1$-C$_4$alkyls; phenyl either unsubstituted or substituted with 1, 2 or 3 C$_1$-C$_4$alkyls or with 1, 2 or 3 C$_1$-C$_4$alkoxy; or benzyl either unsubstituted or substituted with 1, 2 or 3 C$_1$-C$_4$alkyls;
R$_8$ is C$_2$-C$_8$alkylene;
R$_9$ is C$_1$-C$_8$alkyl, C$_5$-C$_8$cycloalkyl either unsubstituted or substituted with 1, 2 or 3 C$_1$-C$_4$alkyls; phenyl either unsubstituted or substituted with 1, 2 or 3 C$_1$-C$_4$alkyls or with 1, 2 or 3 C$_1$-C$_4$alkoxy; benzyl either unsubstituted or substituted with 1, 2 or 3 C$_1$-C$_4$alkyls; tetrahydrofurfuryl or a group of the formula (II);
A' is as defined above for A;
p is 1, 2 or 3 and, when p is 1, R$_{10}$ is C$_2$-C$_{12}$alkylene, when p is 2, R$_{10}$ is C$_2$-C$_6$alkanetriyl, C$_6$-C$_7$cycloalkanetriyl or C$_7$-C$_9$bicycloalkanetriyl, when p is 3, R$_{10}$ is C$_3$-C$_4$alkanetetrayl;
R$_{11}$ and R$_{12}$, which may be identical or different, are as defined above for R$_9$ or together with the nitrogen atom to which they are bound represent a 1-pyrrolidyl, 1-piperidyl or 4-morpholinyl group;

R$_{13}$ is C$_2$-C$_8$alkylene;
R$_{14}$ is as defined above for R$_9$;
R$_{15}$ is a direct linkage or C$_1$-C$_{12}$alkylene;
R$_{16}$ is hydrogen or C$_1$-C$_{12}$alkyl;
R$_{17}$ is C$_2$-C$_{12}$alkylene;
R$_{18}$ is —CH$_2$— or —CH$_2$CH$_2$—;
R$_{19}$ is hydrogen or methyl;
R$_{20}$ and R$_{21}$, which may be identical or different, are one of the groups of the formula (IVa)-(IVe) in which R$_{23}$, R$_{24}$ and R$_{25}$, which may be identical or different, are as defined above for R$_9$, or R$_{23}$ and R$_{24}$ together with the nitrogen atom to which they are bound represent a 1-pyrrolidyl, 1-piperidyl or 4-morpholinyl group;
E is >CO, —CH$_2$CH$_2$— or —CH$_2$CO—;
q is zero or 1 and, when q is zero, E is —CH$_2$CH$_2$—;
A" is as defined above for A;
R$_{22}$ is C$_2$-C$_8$alkylene;
X$_1$ is as defined above for R$_{11}$ or is a group (R$_{27}$)3SIO— with R$_{27}$ being C$_1$-C$_8$alkyl;
X$_2$ is hydrogen, C$_1$-C$_{18}$alkyl or a group (R$_{27}$)3Si— with R$_{27}$ as defined above;
m and n are numbers from 1 to 40 and, when m+n is a number from 3 to 10, X$_1$ and X$_2$ together also form a direct linkage.

3. A compound of the formula (I) according to claim 1, in which A is —O— or >N—R$_6$ where R$_6$ is hydrogen, C$_1$-C$_{10}$alkyl, cyclohexyl either unsubstituted or substituted with 1, 2 or 3 C$_1$-C$_4$alkyls; benzyl, tetrahydrofurfuryl, C$_2$-C$_3$alkyl substituted in position 2 or 3 with methoxy, with ethoxy, with dimethylamino or with diethylamino; or a group of the formula (II);
R$_1$ and R$_4$, which may be identical or different, are C$_1$-C$_4$alkyl, C$_1$-C$_4$alkoxy or OH;
R$_2$ is C$_2$-C$_6$alkylene or is a direct linkage, when A is —O— and R$_1$ is C$_1$-C$_4$alkyl;
R$_5$ is one of the groups of the formula (IIIa)-(IIIg) in which
R$_7$ is C$_1$-C$_8$alkyl, cyclohexyl either unsubstituted or substituted with 1, 2 or 3 C$_1$-C$_4$alkyls; phenyl, tolyl, ethylphenyl, di-t-butylphenyl, methoxyphenyl or benzyl;
R$_8$ is C$_2$-C$_6$alkylene;
R$_9$ is C$_1$-C$_4$alkyl, cyclohexyl either unsubstituted or substituted with 1, 2 or 3 C$_1$-C$_4$alkyls; phenyl, benzyl, tetrahydrofurfuryl or a group of the formula (II);
A' is as defined above for A;
p is 1, 2 or 3 and, when p is 1, R$_{10}$ is C$_2$-C$_{10}$alkylene, when p is 2, R$_{10}$ is
C$_2$-C$_{14}$alkanetriyl, cyclohexanetriyl or bicycloheptanetriyl, when p is 3, R$_{10}$ is propanetetrayl;
R$_{11}$ and R$_{12}$, which may be identical or different, are as defined above for R$_9$ or together with the nitrogen atom to which they are bound represent 4-morpholinyl;
R$_{13}$ is C$_2$-C$_6$alkylene;
R$_{14}$ is as defined above for R$_9$;
R$_{15}$ is a direct linkage or C$_1$-C$_8$alkylene;
R$_{16}$ is hydrogen or C$_1$-C$_8$alkyl;
R$_{17}$ is C$_3$-C$_6$alkylene;
R$_{18}$ is methylene;
R$_{19}$ is hydrogen;
R$_{20}$ and R$_{21}$, which may be identical or different, are one of the groups of the formula (IVa)-(IVe) in which $R_{23}$, $R_{24}$ and $R_{25}$, which may be identical or different, are as defined above for $R_9$, or $R_{23}$ and $R_{24}$ together with the nitrogen atom to which they are bound represent a 4-morpholinyl group or $R_{25}$ can also be tolyl, ethylphenyl, di-t-butylphenyl or methoxyphenyl;

E is >CO or —$CH_2CH_2$—;

q is zero or 1 and, when q is zero, E is —$CH_2CH_2$—;

A" is as defined above for A;

$R_{22}$ is $C_2$-$C_6$alkylene;

$X_1$ is as defined above for $R_1$ or is a group $(R_{27})_3$SiO— with $R_{27}$ being $C_1$-$C_4$alkyl;

$X_2$ is hydrogen, $C_1$-$C_4$alkyl or a group $(R_{27})_3$Si— with $R_{27}$ as defined above;

m and n are numbers from 1 to 40 and, when m+n is a number from 3 to 10, $X_1$ and $X_2$ together also form a direct linkage.

4. A compound of the formula (I) according to claim 1, in which

A is —O— or >N—$R_6$ where $R_6$ is hydrogen, $C_1$-$C_8$alkyl, cyclohexyl, benzyl, tetrahydrofurfuryl or a group of the formula (II);

$R_1$ and $R_4$, which may be identical or different, are methyl, methoxy, ethoxy or OH;

$R_2$ is $C_2$-$C_3$alkylene or is a direct linkage, when A is —O— and $R_1$ is methyl;

$R_5$ is a group of the formula (IIIa), (IIIb), (IIIc), (IIId) or (IIIg) in which $R_7$ is $C_1$-$C_4$alkyl, phenyl, tolyl, di-t-butylphenyl or benzyl;

$R_8$ is $C_2$-$C_3$alkylene;

$R_9$ is $C_1$-$C_3$alkyl, cyclohexyl, benzyl or a group of the formula (II);

A' is as defined above for A;

p is 1 or 2 and, when p is 1, $R_{10}$ is $C_2$-$C_{10}$alkylene, when p is 2, $R_{10}$ is $C_2$-$C_{14}$alkanetriyl;

$R_{11}$ and $R_{12}$, which may be identical or different, are as defined above for $R_9$;

$R_{13}$ is $C_2$-$C_3$alkylene;

$R_{14}$ is as defined above for $R_9$;

$R_{15}$ is $C_2$-$C_3$alkylene;

$R_{20}$ and $R_{21}$, which may be identical or different, are a group of the formula (IVa), (IVb), (IVc) or (IVe) in which $R_{23}$, $R_{24}$ and $R_{25}$, which may be identical or different, are as defined above for $R_9$, or $R_{25}$ can also be phenyl or di-t-butylphenyl;

E is >CO or —$CH_2CH_2$—;

q is zero or 1 and, when q is zero, E is —$CH_2CH_2$—;

A" is as defined above for A;

$R_{22}$ is $C_2$-$C_3$alkylene;

$X_1$ is as defined above for $R_1$ or is a group $(R_{27})_3$SiO— in which $R_{27}$ is methyl;

$X_2$ is hydrogen, methyl, ethyl or a group $(R_{27})_3$Si— with $R_{27}$ as defined above;

m and n are numbers from 1 to 35 and, when m+n is a number from 3 to 10, $X_1$ and $X_2$ together also form a direct linkage.

5. A compound of the formula (I) according to claim 1, in which $R_3$ and $R_{26}$, which may be identical or different, are hydrogen, $C_1$-$C_4$alkyl, $C_1$-$C_{12}$alkoxy, $C_5$-$C_{12}$cycloalkoxy, benzyl either unsubstituted or substituted with 1, 2 or 3 $C_1$-$C_4$alkyls; or $C_1$-$C_4$acyl.

6. A compound of the formula (I) according to claim 1, in which A is —O— or >N—$R_6$ where $R_6$ is hydrogen, $C_1$-$C_4$alkyl or a group of the formula (II);

$R_1$ and $R_4$, which may be identical or different, am methyl, methoxy, ethoxy or OH;

$R_2$ is trimethylene;

$R_3$ is hydrogen or methyl;

$R_5$ is a group of the formula (IIIb), (IIIc) or (IIIg);

$R_9$ is a group Of the formula (II);

A' is as defined above for A;

p is 1 or 2 and, when p is 1, $R_{is\ C2}$-$C_{10}$alkylene, when p is 2, $R_{10}$ is $C_2$-$C_{14}$ alkanetriyl;

$R_{11}$ and $R_{12}$, which may be identical or different, are as defined above for $R_9$;

$R_{13}$ and $R_{15}$ are trimethylene;

$R_{20}$ and $R_{21}$, which may be identical or different, are a group of the formula (IVa), (IVb) or (IVc);

$R_{23}$, $R_{24}$ and $R_{25}$, which may be identical or different, are as defined above for $R_9$;

$R_{26}$ is as defined above for $R_3$;

E is >CO and q is 1;

A" is as defined above for A;

$R_{22}$ is trimethylene;

$X_1$ is as defined above for $R_1$ or is a group $(R_{27})_3$SiO— in which $R_{27}$ is methyl;

$X_2$ is hydrogen, methyl, ethyl or a group $(R_{27})_3$Si— with $R_{27}$ as defined above, m and n are numbers from 1 to 35 and, when m+n is a number from 3 to 10, $X_1$ and $X_2$ together also form a direct linkage.

7. A composition comprising an organic material susceptible to degradation induced by light, heat or oxidation and at least one compound of the formula (I) according to claim 1.

8. A composition according to claim 7 in which the organic material is a synthetic polymer.

9. A composition according to claim 8 comprising, in addition to the compounds of the formula (I), other conventional additives for synthetic polymers.

10. A composition according to claim 7 in which the organic material is a polyolefin.

11. A composition according to claim 7 in which the organic material is polyethylene or polypropylene.

12. A method for stabilizing an organic material against degradation induced by light, heat or oxidation, which comprises incorporating into said organic material at least one compound of the formula (I) according to claim 1.

* * * * *